Figure 1:
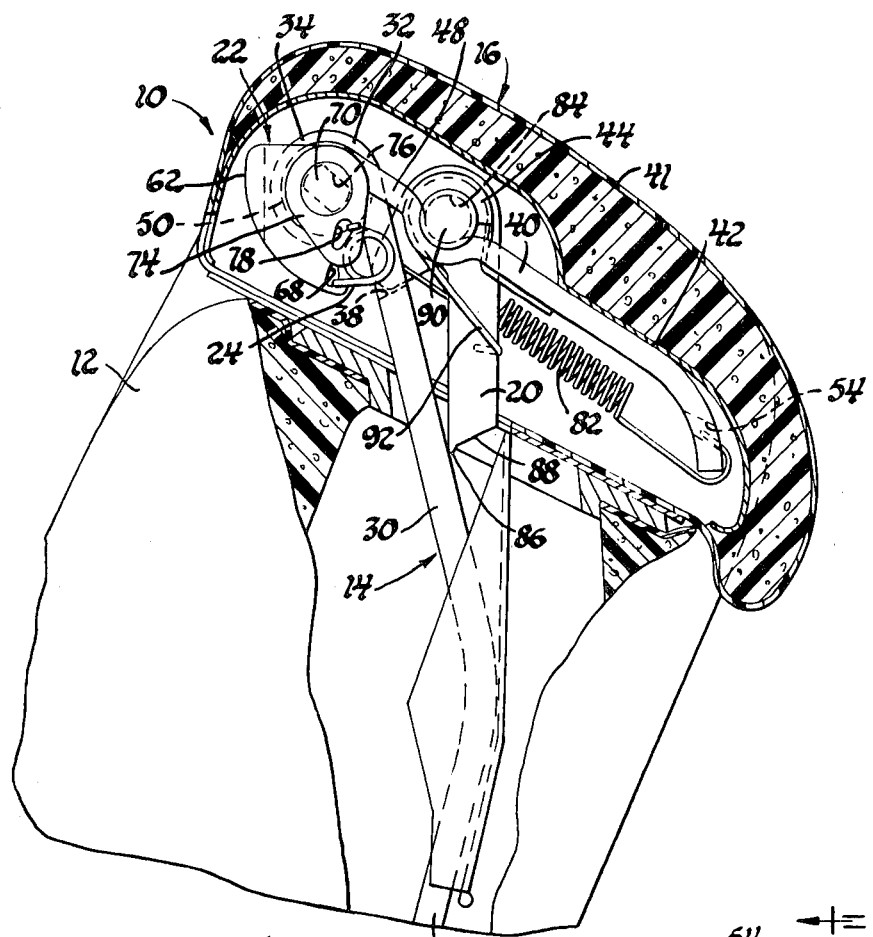

United States Patent [19]

Kapanka

[11] 4,113,310
[45] Sep. 12, 1978

[54] HEADREST FOR VEHICLES
[75] Inventor: Harley L. Kapanka, Utica, Mich.
[73] Assignee: General Motors Corporation, Detroit, Mich.
[21] Appl. No.: 862,954
[22] Filed: Dec. 21, 1977
[51] Int. Cl.² ............................................... A47C 1/10
[52] U.S. Cl. ................................................... 297/408
[58] Field of Search ............... 297/391, 408, 112, 114, 297/409, 410

[56] References Cited

U.S. PATENT DOCUMENTS

| | | | |
|---|---|---|---|
| 2,886,097 | 5/1959 | Katz | 297/410 X |
| 3,948,562 | 4/1976 | Graebner et al. | 297/408 |

*Primary Examiner*—James G. Mitchell
*Attorney, Agent, or Firm*—John P. Moran

[57] ABSTRACT

The drawings illustrate an angularly adjustable head restraint assembly for use with the backrest of a vehicle seat. The assembly includes a post carried by the backrest, a headrest pivotally connected to the post and adapted to being manually pivotally moved from a horizontally oriented reclined attitude to a vertically oriented head support attitude, locking means for locking the headrest in the vertically oriented head support attitude, a cam with cooperating overcenter spring means for causing the cam to snap overcenter once it is provided forwardly from the head support attitude by the headrest to urge the locking means out of its locked relationship with the headrest and permit the headrest to be lowered toward the reclined attitude, and a projection formed on the locking means for contacting the cam and causing it to snap overcenter in the other direction just prior to the headrest attaining the reclined attitude into position for the next sequence.

2 Claims, 5 Drawing Figures

U.S. Patent   Sept. 12, 1978   Sheet 1 of 2   4,113,310

HEADREST FOR VEHICLES

The invention relates generally to headrest for vehicles and, more particularly, to angularly adjustable headrests.

Heretofore, angularly adjustable vehicular headrests have generally included spring loaded ratchet means or other toothed connection means for rotating and retaining the headrest. While such arrangements have performed satisfactorily, a general object of this invention is to provide an improved, efficient adjustable headrest which does not require a ratchet or other toothed connection.

Another object of the invention is to provide an improved, angularly adjustable headrest including a locking lever and cooperating cam means and overcenter spring means for retaining the headrest in either a horizontally oriented reclined position or a vertically oriented head support position.

A further object of the invention is to provide an angularly adjustable head restraint assembly for use with the backrest of a vehicle seat, and including a post carried by the backrest, headrest means pivotally connected to the post and adapted to being manually pivotally moved from a horizontally oriented reclined position to a vertically oriented head support position, slot means formed in the post, a spring-loaded locking lever pivotally connected to the headrest means and adaptable to being pivotally moved into a locked position in the slot upon movement of the headrest means from the reclined attitude to the head support attitude, cam means pivotally connected to the post and adapted to being pivotally moved into the slot means when the headrest means is manually pivoted forwardly a predetermined amount from the head support position, overcenter spring means operatively connected to the cam means for causing the cam means to snap overcenter in the direction of the slot means once said cam means is pivoted a predetermined amount by the headrest means to urge the locking lever out of the locked position in the slot means and permit the headrest means to be lowered toward the reclined attitude, and projection means formed on an upper portion of the locking lever for contacting the cam means and causing the cam means to snap overcenter in the other direction out of the slot means into position for the next sequence just prior to the headrest means attaining the reclined attitude.

Figure 2:
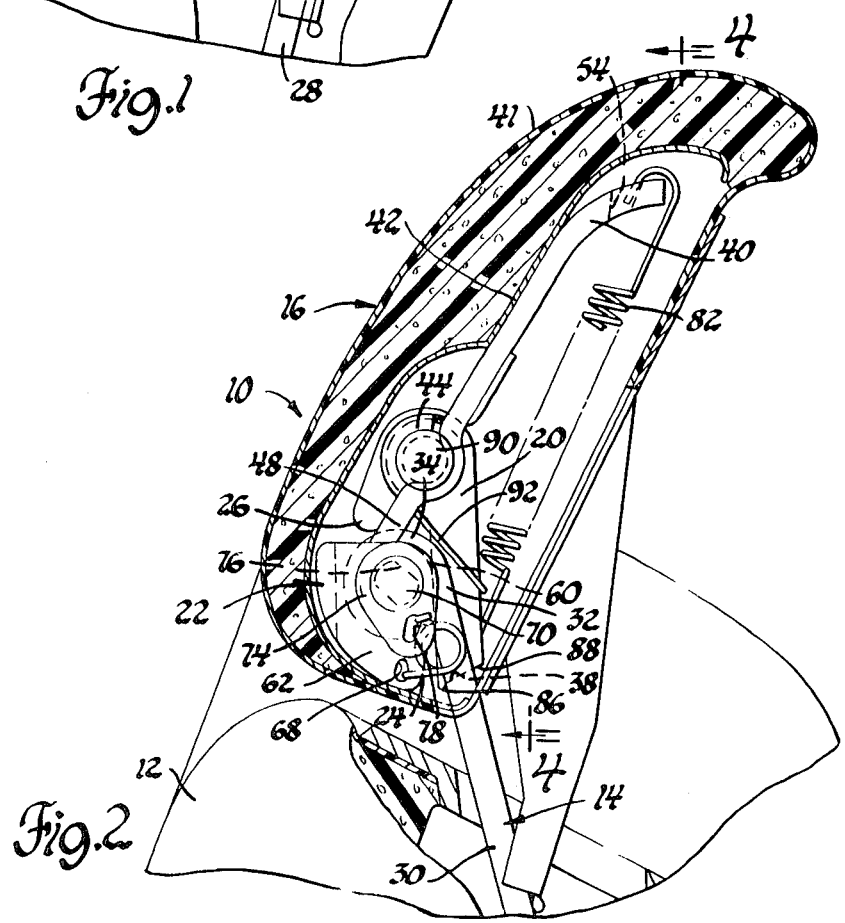
Figure 3:
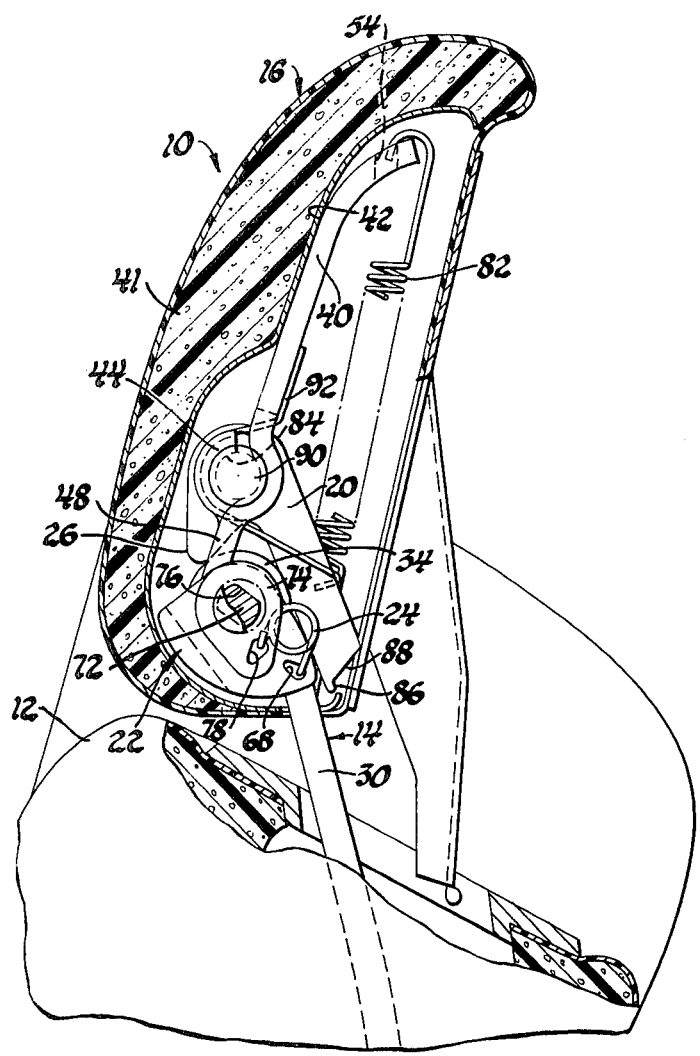
Figure 5:
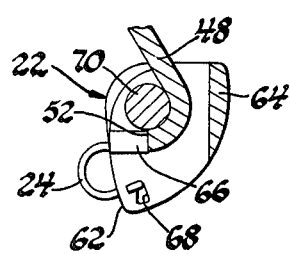
Figure 4:
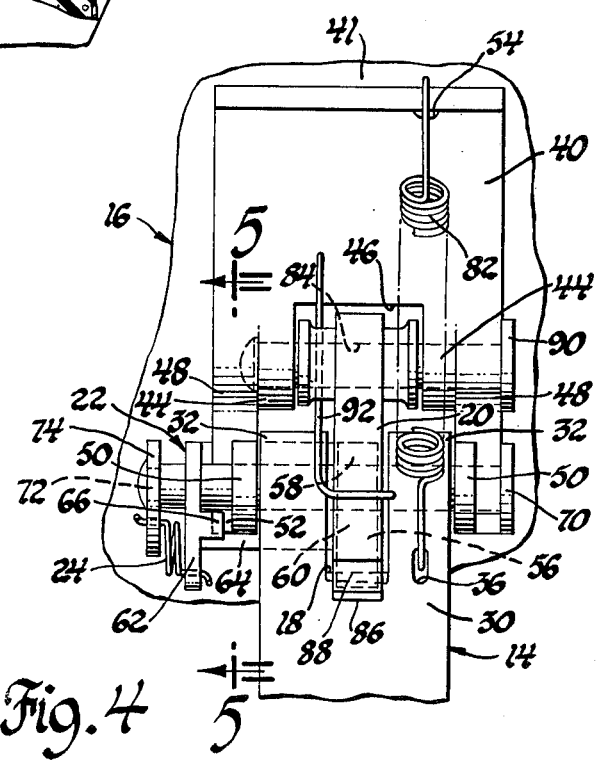

These and other objects of the invention will become more apparent when reference is made to the following description and accompanying drawings, wherein:

FIGS. 1 and 2 are cross-sectional views of a head restraint assembly embodying the invention and positioned, respectively, in two operational positions;

FIG. 3 is a cross-sectional view of the head restraint assembly of FIGS. 1 and 2 in an unlocking position; and FIGS. 4 and 5 are fragmentary cross-sectional views taken along the planes of the lines 4—4 and 5—5 of FIGS. 2 and 4, respectively, and looking in the direction of the arrows.

Referring now to the drawings in greater detail, the figures illustrate a head restraint assembly 10 for use with the backrest 12 of a vehicle seat. Generally, the assembly 10 includes a post 14 carried by and mounted interiorly of the backrest 12 and projecting exteriorly therefrom at the upper end thereof and headrest means 16 pivotally connected to the post 14 and adapted to being manually pivotally moved from a horizontally oriented reclined attitude to a vertically oriented head support attitude. A vertical slot 18 is formed in the extended end of the post 14. A spring-loaded locking lever 20 is pivotally connected to the headrest means 16 for selective movement into a locked position in the slot 18 in response to a predetermined upward manual movement of the headrest means. A cam means 22 is pivotally connected to the post 14 for selective movement into the slot 18 in response to a predetermined forward manual movement of the headrest means. An overcenter spring 24 is operatively connected to the cam means 22 for causing the cam to snap overcenter once it is pivoted a predetermined amount to urge the locking lever 20 out of its locked position in the slot 18 and permit the headrest means to be lowered. A projection 26 is formed on an upper portion of the locking lever 20 for contacting the cam means 22 and causing it to snap overcenter in the other direction out of the slot 18 into position for the next sequence.

More specifically, the post 14 includes a lower stem portion 28 carried by and interiorly of the backrest 12, an upper forwardly inclined portion 30 formed on the lower stem portion 28, a pair of spaced extensions 32 formed on the distal end of the upper forwardly inclined portion 30 and providing the slot 18 therebetween, a forwardly extending loop 34 formed on each of the pair of extensions 32, and a spring-end opening 36 formed in the forwardly inclined portion 30 below one of the pair of extensions. A sloped surface 38 is formed on the bottom of the slot 18 for a purpose to be described.

The headrest means 16 includes a bracket 40 having a padded head restraint member 41 welded thereto. The bracket 40 consists of an upper support surface 42, a pair of centrally located, spaced, forwardly extending loops 44 providing a notch 46 therebetween, a downwardly oriented extension 48 formed outboard of each forwardly extending loop 44, a rearwardly extending loop 50 formed on the distal end of each downwardly oriented extension 48 for straddling the forwardly extending loops 34 on the post 14, a vertical surface 52 formed on the distal end of one of the downwardly oriented extensions 48 outboard of its rearwardly extending loop 50, and a spring-end opening 54 formed adjacent an upper corner of the upper support surface 42.

The cam means 22 includes a cam member 56 formed to include an apertured cam portion 58 having a cam surface 60 formed on the outer peripheral surface thereof, an oppositely disposed, apertured wall portion 62, a bar 64 interconnecting the cam portion 58 and the wall portion 62 (FIG. 4), a tab 66 formed on an inner surface of the wall portion 62, and a spring-end opening 68 formed in the wall portion 62.

A first pin 70 is mounted through the rearwardly extending loops 50 of the bracket 40, the forwardly extending loops 34 of the post 14 and the apertured cam and wall portions 58 and 62 of the cam member 56. A flattened end portion 72 is formed on one end of the pin 70 beyond the wall portion 62.

A disk 74 having an elongated opening 76 formed therethrough is mounted on the flattened end portion 72 on the first pin 70. A spring-end opening 78 is formed adjacent the elongated opening 76. The overcenter spring 24 is mounted between the spring-end openings 78 and 68 in the disk 74 and the wall portion 62 of the cam member 56. A second spring 82 is mounted between the spring-end openings 36 and 54 in the post 14 and the upper support surface 42, serving as an anti-rattle spring.

The locking lever 20 includes an opening 84 formed adjacent the upper end thereof, the forwardly extending projection 26 formed on the upper end, and a downwardly extending bead 86 formed on one end of the bottom surface 88 thereof, the latter being sloped so as to provide a locking characteristic in conjunction with the front edge of the notch 18 in the post 14. A second pin 90 is mounted through the forwardly extending loops 44 of the bracket 40 and the opening 84 of the locking lever 20.

A third spring 92 is mounted so as to have one end thereof extended across a rear surface of the locking lever and the other end thereof looped around the front of the upper end of the locking lever 20 and behind the upper support surface 42 of the bracket 40 for urging the lower end thereof against the forwardly inclined portion of the post 14 and at times into the slot 18 in the post 14.

OPERATION

As the headrest 16 is manually pivoted from the horizontally oriented reclined position of FIG. 1 to the vertically oriented head support position of FIG. 2, the locking lever 20 is pivoted into the slot 18 such that the sloped bottom surface 88 thereof locks-up on the sloped bottom surface 38 of the slot 18 to maintain the headrest in its head support position. The bead 86 helps to assure that a locked condition exists by hooking over the forward edge of the bottom surface 38.

Once the headrest 16 is manually pivoted forwardly a predetermined amount from the head support position of FIG. 2 to the position illustrated in FIG. 3, the tab 66 of cam 56 is contacted by the vertical surface 52 of the bracket 40 and urged toward the slot 18, whereupon the spring 24 causes the cam member 56 to snap overcenter into the slot 18, forcing the locking lever 20 out of the slot and, thus permits the headrest 16 to be lowered to the reclined position of FIG. 1.

Just prior to the headrest 16 attaining the reclined position, the forwardly extending projection 26 on the upper end of the locking lever 20 contacts the cam surface 60 of the cam member 56, causing the latter to snap overcenter in the other direction under the force of the spring 80, into position for the next sequence.

It should be noted that the bead 86 on the locking lever 20 and the spring 82 are not essential to the invention, but serve the respective purposes of helping to assure a locked condition and preventing the assembly from rattling.

It should be noted that the invention provides an efficient angularly adjustable head restraint assembly, and that the post supporting the assembly could also be vertically adjustable with respect to the backrest in any conventional manner.

While but one embodiment of the invention has been shown and described, other modifications thereof are possible.

The embodiments of the invention in which an exclusive property or privilege is claimed are defined as follows:

1. For use with the backrest of a vehicle seat, an angularly adjustable head restraint assembly comprising a post carried by and mounted interiorly of the backrest and projecting exteriorly therefrom at the upper end thereof, headrest means pivotally connected to said post and adapted to being manually pivotally moved from a horizontally oriented reclined attitude to a vertically oriented head support attitude, slot means formed in said post, cam means pivotally connected to said post and adapted to being pivotally moved into and out of said slot means, a locking lever pivotally connected to said headrest means adjacent said cam means, projection means formed on an upper portion of said locking lever, overcenter spring means operatively connected to said cam means, and resilient means operatively connected to said locking lever, said resilient means being adapted to initially urge said locking lever into contact with said post and then into said slot means into contact with said cam means when said headrest means is pivoted upwardly through a predetermined angle relative to said post means, thereby locking said headrest means against reverse rotation to said horizontally oriented reclined attitude until said headrest means is pivoted forwardly a predetermined amount into a greater angular relationship with said post to contact and pivot said cam means so as to cause said cam means to snap overcenter in a rearward direction into said slot means under the force of said overcenter spring means and move said locking lever out of said slot means to permit said headrest means to be lowered toward said horizontally oriented reclined attitude until said projection means on said locking lever contacts said cam means and causes said cam means to snap overcenter in the other direction under the force of said overcenter spring means into position for the next sequence.

2. For use with the backrest of a vehicle seat, an angularly adjustable head restraint assembly comprising
a post carried by and mounted interiorly of the backrest and projecting exteriorly therefrom at the upper end with front and rear surfaces formed thereon,
an open-ended slot formed in said upper end perpendicular to the plane of said backrest,
a base bracket including upper and lower connector receiving means and an abutment surface,
a padded headrest support bracket secured to said base bracket,
a cam member having a cam surface, a spring-end receiving portion and an unlocking tab formed thereon,
first pivotal connector means for pivotally interconnecting the upper end of said post, said lower connector receiving means, and said cam member so that said cam surface is aligned with and free to be moved into said slot,
overcenter spring means operatively connected between said first pivotal connector means and said spring-end receiving portion of said cam member,
a locking lever including a downwardly extending stem portion and an upper projection extending forwardly into said slot,
a spring support surface formed adjacent said upper projection,
second pivotal connector means for pivotally interconnecting the upper end of said locking lever and said upper connector receiving means of said base bracket, and
second spring means formed so as to have the ends thereof extended behind said stem and behind said base bracket, respectively, and an intermediate portion in front of said spring support surface of said locking lever for initially urging said stem of said locking lever into contact with said rear surface of said post, and then into said slot in said post into contact with said cam surface when said support and base brackets are pivoted upwardly through a predetermined angle about said first pivotal connector means, thereby locking said head restraint assembly against reverse rotation toward the reclined position until said head restraint is pivoted forwardly a predetermined amount, raising and rotating said cam surface and causing said cam member to snap overcenter in one direction to thereby move said stem of said locking lever out of said slot to thereafter ride down the rear surface of the post when said support and base brackets are lowered rearwardly until said upper projection on said locking lever engages said cam surface, causing said cam member to snap back overcenter in the other direction into position for the next sequence.

* * * * *